Patented July 14, 1931

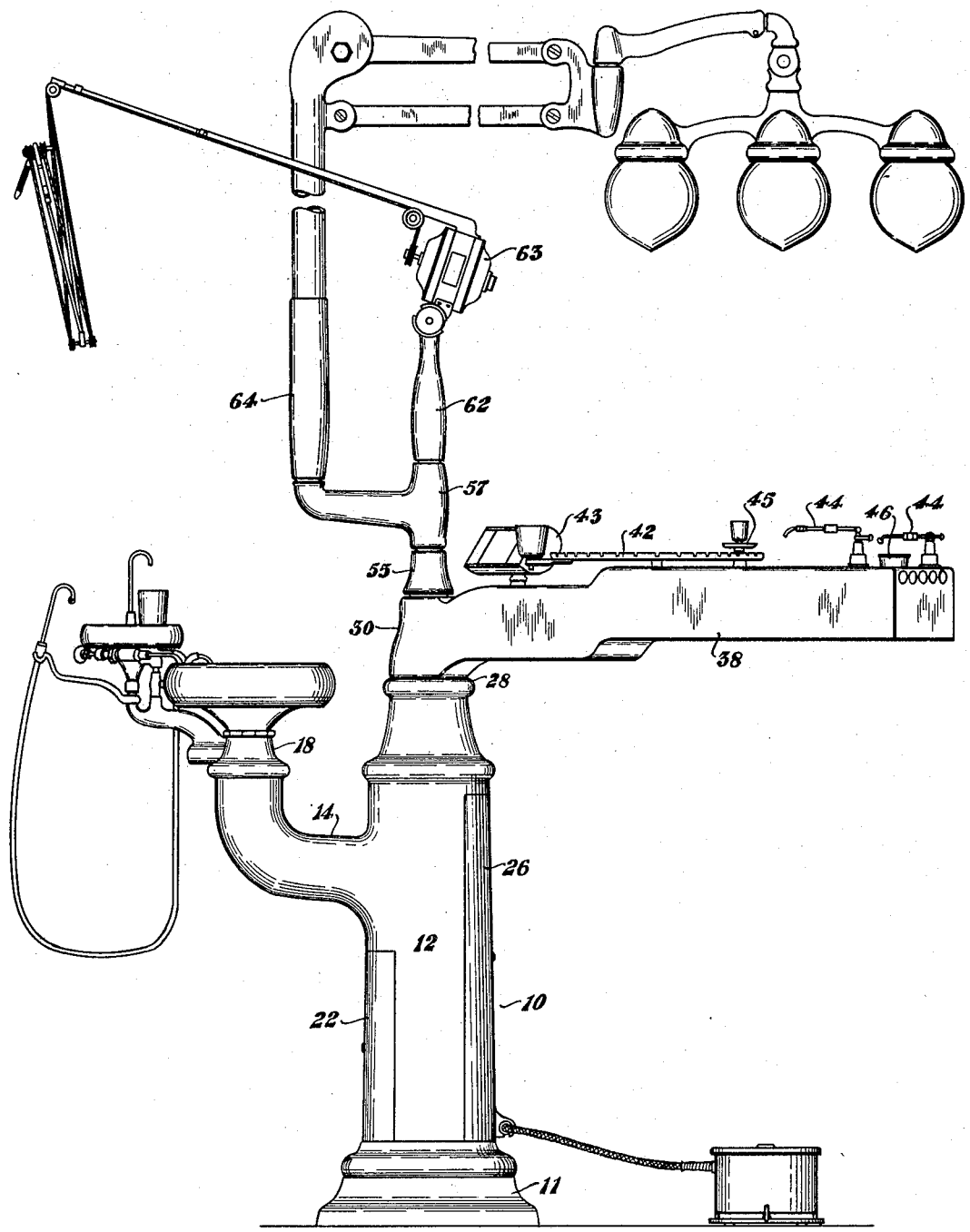

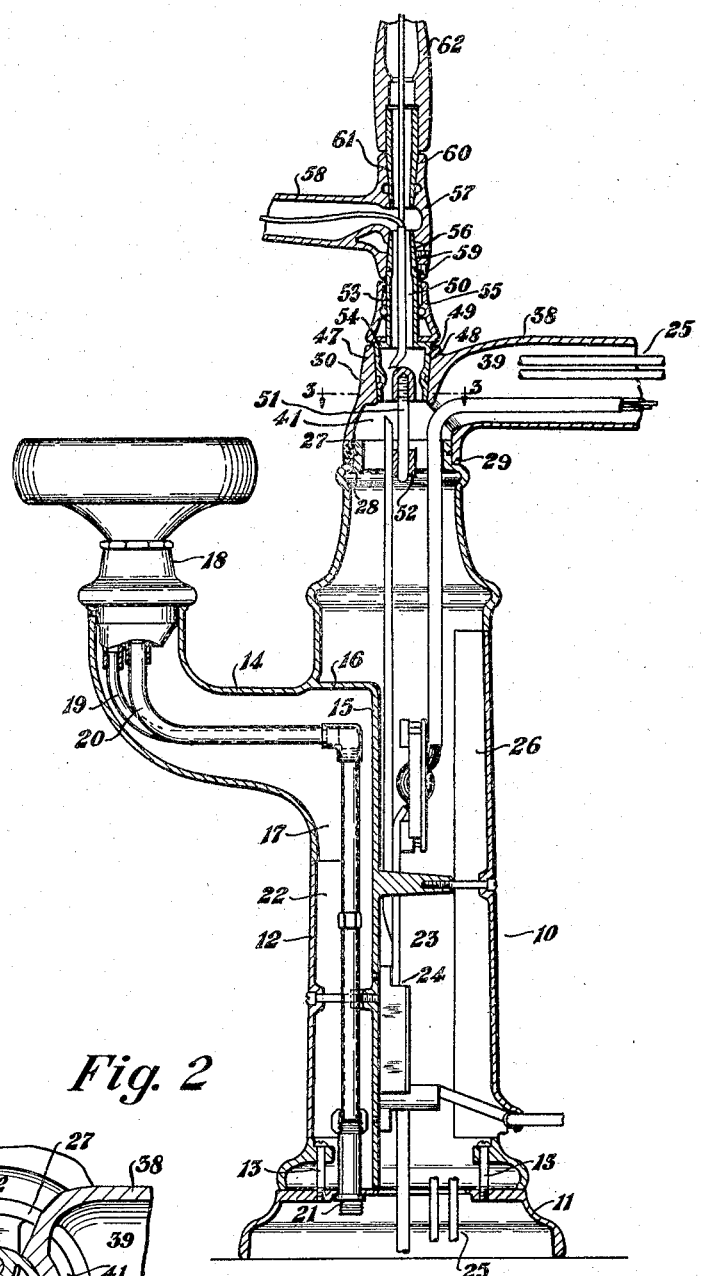
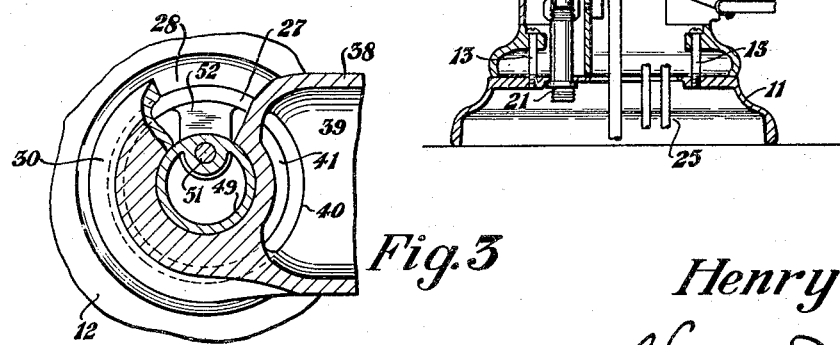

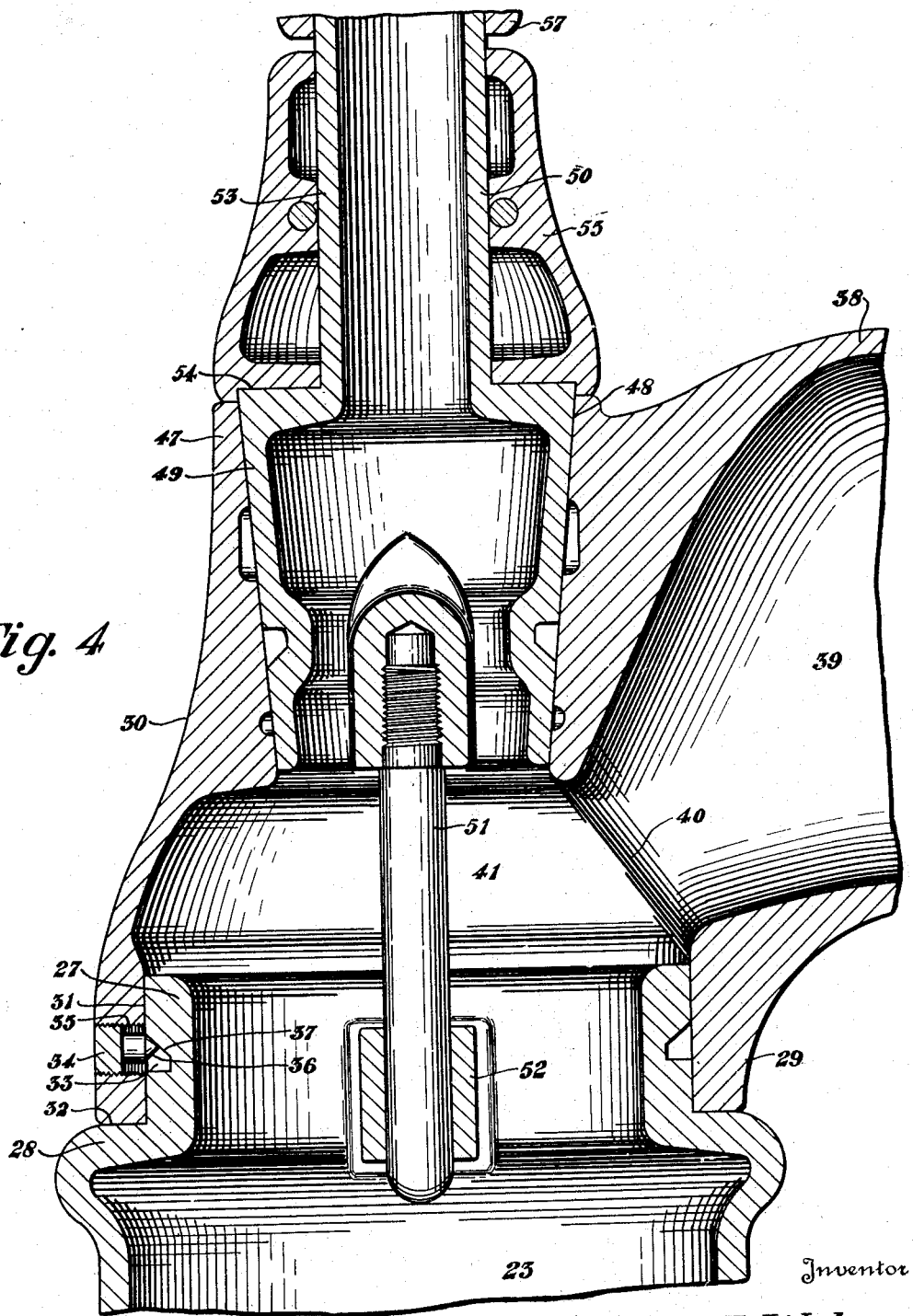

1,814,875

UNITED STATES PATENT OFFICE

HENRY E. WEBER, OF CANTON, OHIO, ASSIGNOR TO THE WEBER DENTAL MANUFACTURING COMPANY, OF CANTON, OHIO, A CORPORATION OF OHIO

DENTAL UNIT STANDARD

Application filed November 10, 1928. Serial No. 318,338.

The invention relates to standards for mounting a dental engine, and the objects of the present improvements include the provision of a novel dental unit standard, upon which a dental engine may be mounted for rotation about a vertical axis, and on which one or more sleeves may be mounted for rotation independently of each other and of the engine, one or more of the sleeves each being adapted for supporting auxiliary equipment or apparatus used by a dentist when operating the dental engine, such as a universally movable light or lights, a supporting arm and housing for carrying an instrument tray and a plurality of heated spray bottles, or the like.

These and ancillary objects are attained in the present invention, a preferred embodiment of which is hereinafter set forth in detail, and is illustrated in the accompanying drawings forming part hereof, in which Figure 1 is an elevation view of one of the improved dental unit standards hereof;

Fig. 1, a fragmentary vertical axial sectional view thereof;

Fig. 3, an enlarged transverse sectional view thereof as on line 3—3, Fig. 2, distant parts being removed; and Fig. 4, an enlarged fragmentary sectional view similar to Fig. 2 more clearly illustrating details of the improved standard.

Similar numerals refer to similar parts throughout the several views.

The improved dental unit standard indicated generally at 10 includes a base 11 which may rest upon the floor, and on the upper end of which is supported a main tubular standard and housing section 12, the lower end of the standard section 12 being preferably secured to the base 11 by means of screws 13.

A cuspidor supporting tubular elbow 14 preferably extends from one side of the main standard section 12, and a longitudinally extending partition wall 15 merging with a horizontally extending end closure wall 16, forms with one side of the tubular wall of the main section 12, a longitudinal duct 17 within the main standard section 12, and the duct 17 communicates at its upper end with the tubular elbow 14.

A cuspidor 18 is supported at the upper end of the elbow 14; and supply and waste pipes 19 and 20 for the cuspidor, are entirely enclosed within the elbow 14 and the duct 17, and may extend from the lower end of the cuspidor to suitable fittings located at 21 adjacent the base 11, where connections may be made with proper pipes in the building in which the dental unit is being used. By providing the duct 17, moisture from the cuspidor pipes is retained in the duct, and is prevented from coming in contact with the electrical parts of the unit.

At the cuspidor side of the standard, a removable door 22 is preferably provided in a suitable opening in the outer wall of the main standard section 12, for permitting access to the pipes in the duct 17.

The walls 15 and 16 also form with the other side and upper end of the wall of the tubular main section 12, a longitudinally extending duct 23, forming a housing for various electrical parts and cables for the unit indicated generally at 24, and for air and gas tubes indicated generally at 25.

A removable door 26 is provided in a suitable opening in the outer wall of the main standard section 12, for access to the electrical parts and cables, and the air and gas tubes in the duct 23.

The main standard section 12 is provided with a cylindric upper end 27 of reduced diameter, the lower end of which is connected with the intermediate portion of the main standard section 12 by an outwardly extending shoulder flange 28.

The lower end 29 of a sleeve 30 rotatably fits over the upwardly extending cylindric end 27, and the outer cylindric surface of the end 27 forms a radial bearing at 31 for the inner cylindric surface of the sleeve 30, and the upper surface of the shoulder 28 provides a thrust bearing at 32 for the annular lower end surface of the sleeve 30.

A preferably bevelled outwardly opening annular groove 33 is formed in the outer cylindrical surface of the main standard section upper end 27; and one or more set screws 34 may be each adjustably mounted in a suitably threaded aperture 35 in the lower end 29 of the sleeve 30, so that the conical inner end 36, with which the set screw is preferably provided, is in slidable retaining engagement with the bevelled face 37 of the groove 33.

A laterally extending tubular supporting and housing arm 38 is connected at its inner end with the sleeve 30, and the interior 39 of the arm 38 communicates at the neck 40 with the interior 41 of the sleeve 30, and the interior 41 of the sleeve 30 communicates with the duct 23 in the main standard section 12.

The laterally extending supporting arm 38 may have mounted thereon a plurality of dental appliances, such as an instrument tray 42, an X-ray print illuminator 43, air or liquid sprays 44, a Bunsen burner 45, a heated liquid receptacle 46, and the like; and the various electrical cables, and air and gas tubes for supplying these instruments are located, as aforesaid, within the duct 23 and extend therefrom through the interior 41 of the sleeve 30 into the interior 39 of the supporting arm 38, and are thus entirely housed within the standard and the supporting arm.

The upper end 47 of the sleeve 30, is provided with a conically tapered seat 48 for receiving the conically tapered lower end 49 of an upwardly extending standard extension section 50.

Improved means for maintaining the standard extension section 50 stationary with respect to the main standard section 12, when the sleeve 30 is rotated, preferably include a pin 51 secured to and depending from the lower tapered end 49 of the standard extension section 50, the longitudinal axis of the pin 51 being offset from the common longitudinal axis of the main section 12 and the extension section 50.

The lower end of the pin 51 is inserted in an aperture in a lug 52 extending inwardly from the upper end 27 of the main standard section 12.

The axis of the pin 51 being offset, as aforesaid, from the common vertical axis of the lower standard section 12 and the upper extension section 50, prevents rotation of the extension section 50 about its vertical axis, and permits rotation of the sleeve 30 interposed between the main standard section 12 and the extension section 50.

The central portion 53 of the standard extension section 50 is preferably reduced in diameter, and a shoulder 54 is thus formed between the lower tapered end 49 and the central portion 53.

A sleeve 55 may be rotatably supported on the bearing surfaces of the central portion 53 and the shoulder 54, and the sleeve 55 may if desired provide a rotatable mounting for a supporting arm similar to the arm 38.

The upper end 56 of the standard extension section 50 is conically tapered, and fits in a conical socket in the lower end of a light bracket mounting sleeve 57, from one side of which extends a tubular light bracket arm 58.

The light bracket arm 58 is rotatable about the vertical axis of the standard on the upper conically tapered end 56 of the standard extension 50, but it is preferable to secure the arm 58 at a convenient position with respect to the cuspidor, by means of one or more set screws 59, by which the sleeve 57 becomes in effect a part of the standard extension section 50.

The upper end 60 of the sleeve 57 has formed therein a conical socket which rotatably mounts the conically tapered lower end 61 of a dental engine handle support 62, upon the upper end of which a dental engine 63 is mounted.

At the outer end of the light bracket arm 58, a light cluster support 63 is pivotally mounted.

Accordingly the sleeves 30, and 55, the dental engine handle support 62, and the light cluster support 64 are all mounted on the same standard, and are all independently rotatable to any desired positions.

I claim:

1. A standard for dental units and the like, including a lower section, an upper extension section, a rotatable sleeve interposed between the sections, means preventing rotation of the extension section including a member extending between and in abutment with both sections, the sections being coaxial, and the member being offset from the common axis.

2. A standard for dental units and the like, including a lower section, an upper extension section, a rotatable sleeve interposed between the sections, means preventing rotation of the extension section including a member within the sleeve extending between and in abutment with both sections, the sections being coaxial, and the member being offset from the common axis.

3. A standard for dental units and the like including a lower section, a rotatable sleeve journaled on the upper end of the lower section, an upper extension section journaled in the sleeve for relative rotation between the sleeve and upper section, and means extending between the upper and lower sections independently of and spaced from the rotatable sleeve holding the upper section in non-rotatable position relative to the lower section.

In testimony that I claim the above, I have hereunto subscribed my name.

HENRY E. WEBER.